July 20, 1954 M. F. CHUBB 2,684,395
ELECTRIC BATTERY
Filed July 7, 1950 2 Sheets-Sheet 1

INVENTOR.
Melvin F. Chubb
BY
Wood, Arey, Henson & Evans
ATTORNEYS

July 20, 1954  M. F. CHUBB  2,684,395
ELECTRIC BATTERY
Filed July 7, 1950  2 Sheets-Sheet 2

INVENTOR.
Melvin F. Chubb
BY
Wood, Arey, Herron & Evans
ATTORNEYS

Patented July 20, 1954

2,684,395

UNITED STATES PATENT OFFICE 2,684,395

ELECTRIC BATTERY

Melvin F. Chubb, Joplin, Mo., assignor to The Eagle-Picher Company, Cincinnati, Ohio, a corporation of Ohio Application July 7, 1950, Serial No. 172,558

2 Claims. (Cl. 136—90)

This invention relates to electric storage cells or batteries which are of light weight and which are adapted particularly to be used for one-trip service, in which they are discharged over a period of minutes, hours or days, and then discarded. Such batteries are particularly useful for radio-sonde service and the like.

One of the principal objectives of the present invention has been to provide an assembly of minimum cost, yet rugged and reliable, such that it may perform all of the intended functions and fulfill its requirements under the adverse conditions to which the battery may be exposed in use. It is necessary that the units be capable of operating satisfactorily over a wide temperature range since they may be subjected to severely low temperatures at high altitudes. Likewise, for aerial service, where the battery and its associated equipment may be lifted by balloon, weight is an important consideration, and it is an important objective of this invention to provide a rugged unit which is of light weight, either when filled with electrolyte or when empty.

The invention is disclosed in relation to battery cells comprising a magnesium metal-cuprous chloride couple, with water as the electrolyte. Such a combination has been found to provide electromotive force of the desired characteristics and magnitude, depending upon the number of series-connected cells which are employed. However, this couple, while preferred for many purposes, is illustrative only, and it will be understood that the principles of construction upon which this invention is predicated are applicable to batteries of other types, and, in fact, are applicable to rechargeable storage batteries as well as those of the one-trip type.

Briefly, a magnesium metal-copper chloride battery constructed in accordance with my invention consists of a plurality of positive and negative plates or grids which are held in spaced relationship to one another adjacent layers of absorbent medium adapted to be charged with electrolyte, or water, so as to bring it into electrolytic contact with the plates or grids. Heretofore cells of this type were connected one with another in series by means of wires or connector strips appropriately soldered or fastened to the respective elements of the cell. However, in this construction, a portion of one grid or plate of a unitary cell is provided with one or, preferably, a plurality, of yieldable fingers adapted to electrically contact a portion of the electrically opposed plate or grid of the next adjoining cell. More specifically, in a preferred embodiment of my invention, one of the electrodes may be of screen or perforate configuration, whereby it is adapted to be charged with a paste constituting one of the members of the battery couple, and an edgewise portion of this screen may comprise wires or figures which are bent laterally from the plane of its configuration to engage a facial portion of the other or opposite electrode of an adjoining cell. Thus, in a typical magnesium metal-copper chloride cell, one electrode is made of wire screening or copper gauze, with a paste of cuprous chloride charged into the interstices thereof and carried thereby. A marginal end or edgewise portion of this screen projects beyond the portion which is filled with paste, so as to present a plurality of fingers laterally extending and adapted yieldably to engage the back face of the plate of opposite charge of the adjoining cell. In the cuprous chloride-magnesium cell, this construction would dispose the cuprous chloride grid directly adjacent the magnesium metal, with no intervening layer of electrolyte or absorbent material adapted to contain electrolyte, but, in the preferred construction, the plate is of laminated construction, comprising a thin film of magnesium metal disposed adjacent a layer of copper metal which is in electrical contact therewith. Therefore, the fingers of the grid engage the copper back face of the bi-metallic plate electrode, from which electric current passes to the adjoining magnesium plate, thence through the electrolyte to the cuprous chloride grid of the next cell.

Assembly of the elements of a plurality of cells constructed in the manner just described, consists essentially of stacking the respective cell elements one on top of, or facially adjacent, another in the intended order until the desired number of cells has been provided. It is necessary, of course, for each cell to be insulated electrolytically from the others, otherwise short circuiting or by-passing of electric current will occur. Heretofore, it has been the practice to position the elements carefully in prearranged order in boxes or cases but, in accordance with the present invention, a hardenable coating is applied in layer form along the exposed opposite edges and bottom portion of a pile of cell elements arranged in the desired order, whereby a closure or container is constituted for each cell. This material, although applied in plastic or viscous form, is hardened to form such a shell. The viscous nature of the plastic sheathing, as applied, enables liquid-proof engagement of it with the marginal edgewise portions of the grids and plates of the battery and, when it subsequently becomes set and hardened, it holds these elements in a relatively rigid manner. Since the negative of each cell is in electrical connection with the positive of an adjoining cell or vice versa through the contact fingers, no wiring or soldering is required to obtain series connection of the cells one to another.

For purposes of additional rigidity, a cell assembly is encased in a layer of liquidproof sheet material which may be held in place by a means of adhesive tape. This wrapping may be excluded from the endwise portions of the cell, or from portions thereof, such that metal cell elements are accessible at each end of the battery for the soldering or electrical connection of terminal wires thereto. The upper face of the battery is also left accessible for introducing electrolyte thereto.

A battery or cell constructed in the manner just described remains electrolytically inert and stable until electrolyte is added to the absorbent layer between the positive and negative cell elements, but when this occurs, the battery is activated. Electrolyte may be added merely by pouring it into the upper open face of the battery. However, for greater convenience the invention contemplates the provision of a cell assembly in which the bottom portion of each cell contains an aperture through which electrolyte may pass when the cell is dipped, open face up, into a shallow pan containing water or electrolyte.

On the whole, the batteries of the present invention may be constructed in a fraction of the time which heretofore has been required, and the over-all weight is substantially less than that of units constructed in conventional manner and adapted to provide similar voltage or render similar service.

Other featuers and advantages of the invention are disclosed in the following detailed description of the drawings in which a typical construction of a magnesium metal-cuprous chloride battery is described. From the foregoing principles upon which the invention is predicated, and from the following description of a preferred construction, those skilled in the art readily will comprehend various modifications to which the invention is susceptible.

Figure 9:
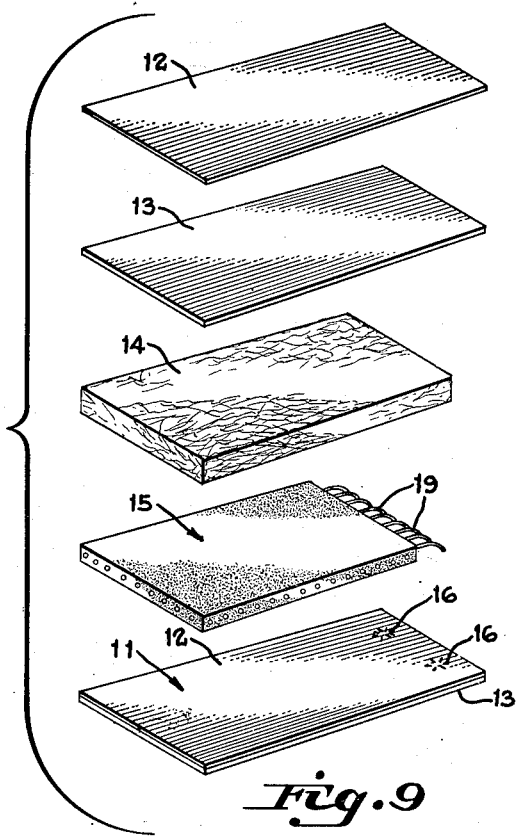

Figure 9 is an exploded view of a series of cell elements arranged in operative sequence. The upper four elements of Figure 9 show the components of a magnesium-cuprous chloride unit cell. Underneath them is shown the upper two elements, copper and magnesium plates, as combined prior to assembly of the battery.

Figure 5:
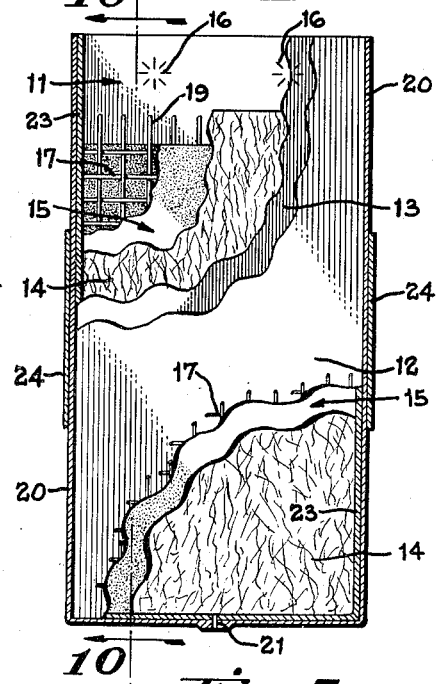
Figure 5 is an enlarged sectional view of the battery assembly taken along the line 5—5 of Figure 2 with portions of the respective elements of the assembly being broken away to show adjacent members.
Figure 10:
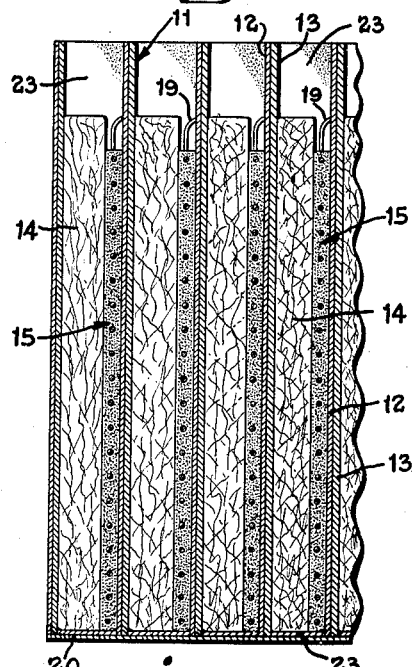

Figure 10 is a sectional view of the battery construction taken along line 10—10 of Figure 5.

The components of a magnesium-cuprous chloride couple are a cuprous chloride carrying electrode and a magnesium electrode. For the purposes of this description the cuprous chloride plate is considered to be the positive plate of the battery. In the present construction these are separated by an absorbent material adapted to receive and contain aqueous electrolyte.

Figure 9 shows the respective cell elements; it is to be noted that these elements are of similar area so that they may be stacked into a pile with regular edgewise surfaces. Bimetallic plate 11 is the negative electrode. It consists of a copper plate 12 in laminate relationship with a thin magnesium plate 13. The electrolyte carrier 14 is a block or layer of absorbent material such as cotton or felt. Element 15 is the cuprous chloride carrying anode.

For electrical interconnection the respective copper and magnesium layer components constituting plate 11 are preferably spot welded together, as at 16, 16, or the two metallic sheets can be crimped or folded one upon the other in any suitable manner to preserve their integrality. Copper sheets 12 are unaffected by electrolyte or other cell reactants during the discharge of the battery since metallic copper is the end product of the reduction of cuprous ion. These copper sheets serve as interconnections between cells because they conduct electric current, yet they also serve as a physical barrier with respect to electrolyte between adjacent cells because of the liquid-proof jointure, to be described, at the edges of the pile structure.

Figure 6:
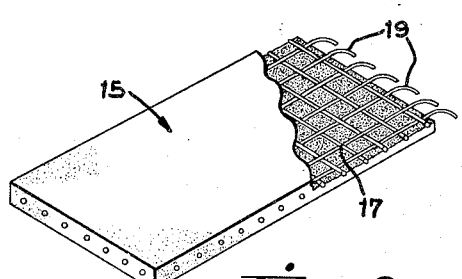
Figure 6 is a perspective view of a screen type grid having yieldable fingers for establishing electrical connection with a member of an adjoining cell.

Positive electrode 15, as shown in Figure 6, has a base portion 17 of screen or perforate material, preferably made of bronze. This screen is impregnated with cuprous chloride, by applying an aqueous cuprous chloride paste to the interstices of the screen. A binder in the paste is desirable to constitute a conveniently spreadable product, and for this purpose approximately a ten per cent by weight proportion of polystyrene has been found to be suitable.

Preferably the paste is spread on both faces of the screen to create layers of copper chloride on both sides thereof, covering all but the marginal ends. By bending these uncovered ends yieldable fingers 19 are formed. These extremities project at obtuse angles from the plane of the screen so that the tips of fingers 19 will lie just beyond the plane of the corresponding cuprous chloride pasted surface. If desired, fingers may be provided along more than one edge or portions of edges of electrode 15. In fact, the configuration of the fingers may be accomplished before application of paste to the screen material, and the fingers themselves may be embedded in hardened paste composition so long as tips thereof are exposed.

Absorbent separating blocks 14 are employed to absorb electrolyte rapidly and to provide an electrolytic circuit across their thicknesses. Felted rayon fibers bound together with a vinyl resin are particularly well suited for these separators.

To assemble a battery the respective elements are stacked in a pile, first, a bimetallic cathode 11 with the copper surface face down, then an absorbent separator 14 resting on the magnesium face of the cathode, then a positive cuprous chloride electrode 15 with the fingers 19 thereof projecting upwardly. This sequence is repeated for as many times as is necessary to produce the desired number of cells. The stacking assembly may be carried out in an aligning frame so that the surfaces defined by the edges of the layer elements will be in regular flush relationship. In the pile, each electrode 15 is disposed so that its fingers 19 will be in pressure contact with the copper surface of the next adjacent bimetallic laminate 11. Contact between fingers 19 and copper plates 12, i. e., between opposite electrodes of adjacent cells, will thus be maintained despite variations in volume of absorbent separators 14 due to the addition or evaporation of electrolyte, or temperature changes in the assembly. In fact, as separators 14 expand, copper surfaces 12 will be pressed even more firmly against fingers 19. If an equal number of cell elements are used in a pile assembly one of the ends of the pile would have a magnesium surface. In order to provide a surface to which a terminal conveniently may be soldered at this end of the pile, an extra copper plate 12 is added to this end.

The stack of cell elements is readily adapted to be surrounded by confining material. This confining material not only serves as a container for electrolyte and encasement for the assembly, but also is an insulator in that it provides liquid-tight seals along the edges of the copper elements which act as physical dividers between cells. This dual purpose encasement is constituted by hardening a plastic material about some or all of the lateral edges of the pile elements. On hardening, this material acquires permanent characteristics, and constitutes a box or casing containing the cells. The material used should be capable of being spread into an even layer and of staying in place prior to hardening. Further, it should not react with the active constituents of the battery.

Such a film may be distributed over the desired surface by direct application, as by painting or dipping, by placing the pile under a relatively slight endwise compression in a mold adapted to receive fluid material about the sides of the pile and effecting its hardening therein, or by enveloping the pile in a coating-carrying wrapper. Such a wrapper may conveniently be stripped from the hardened coating, if desired. But a preferable mode of operation comprises spreading the hardenable material on the tacky side of a pressure responsive adhesive sheet, e. g., a sheet of regenerated cellulose, which remains in place about the pile after the material hardens, acting as a further insulator and enclosure. Materials other than regenerated cellulose may be used, a principal consideration being that the wrapper should not be moisture absorbent. Otherwise its function as an additional insulator, in case of defects in the resin layer, would be impaired.

Thus, following the establishment of this layer on the wrapper sheet, the dry pile elements of the battery are held in assembly in a clamp or in the hand of the manipulator while an adhesive sheet, 20, with its coating layer innermost, is wrapped around sufficient portions of at least three sides of the pile so that a trough-like container is provided around the assembly, the ends of the trough being the endwise, exposed electrodes of the respective end cells. The ends, or portions thereof, of the pile are left exposed so that suitable electrical connectors may be attached to complete the electrical circuit. As shown, copper plates 12 are left entirely free at the ends after the application of wrapper 20.

The upper face of the assembly is left uncovered for introduction of electrolyte to each of the cell units, or for escape of air therefrom when other openings are provided. If the coating material used is of the self-setting type, apertures for introduction of electrolyte to the battery may be established in the assembly by inserting pins through the wrapper sheet 20 and removing them after hardening of the coating so that at least one hole 21 will be associated with each unit cell. With the use of a thermo-setting coating, the pins should be inserted and left in place during the heat hardening operation. Upon removal, small but definite holes 21 will result, facilitating admission of electrolyte to the assembly or conversely facilitating the escape of air. With these holes, sufficient electrolyte can be admitted to the assembly merely by immersing the assembly in the body of electrolyte whereby capillary action through the fibrous absorbent separators results in electrolyte rising therein above the liquid level of the source of electrolyte. The liquid coating forms such a firm bond adjacent absorbent blocks 14 on hardening into panels 23, that a liquid-tight seal results along the edges of the pile. Thus, there is no short circuiting which might otherwise occur due to bypassing of current through creepage of electrolyte from one cell to another. Since the wrapper sheet 20 assumes the configuration of the edgewise surfaces of the pile, the resulting encasement provides a smooth surface for ease in handling in so far as the cell elements themselves are of nearly identical shape. A wrapper of this type does not add significantly either to volume or weight of the completed assembly.

Figure 1:
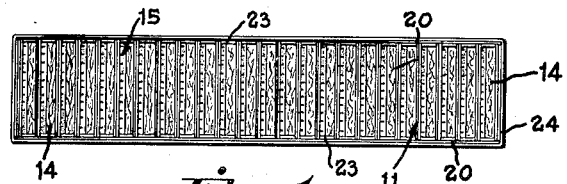
Figure 1 is a top elevation of a battery assembly after the application of a plastic encasement.
Figures 2, 3:
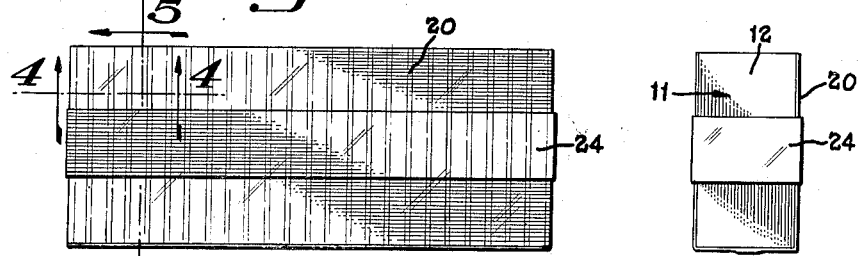
Figure 2 is a side elevation of the battery assembly as shown in Figure 1, with a protective cover applied thereto.
Figure 3 is an end elevation of the battery as shown in Figures 1 and 2.
Figure 4:
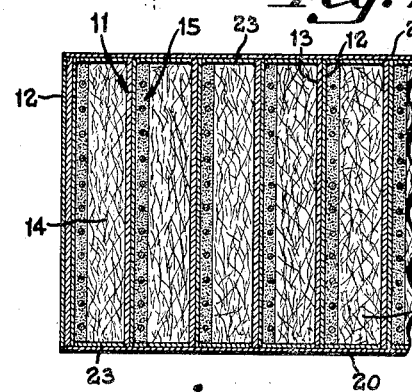
Figure 4 is an enlarged sectional view taken along the line 4—4 of Figure 2.

Wrapper sheet 20 is held in place by wrapping a strip of tape 24 peripherally around the assembly as shown in Figures 2 and 3. This may be regenerated cellulose coated on one face with pressure responsive adhesive. Strip 24 should be disposed so as to leave copper surfaces at each end of the battery assembly free for electrical connection thereto.

Figure 7:
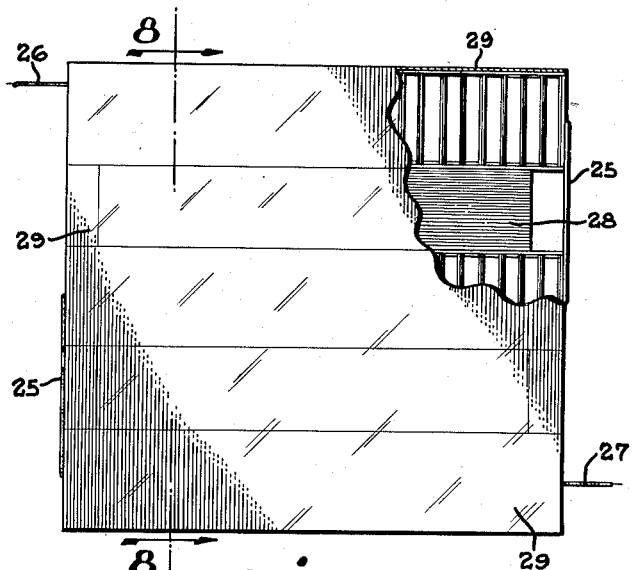
Figure 7 is a top elevation showing three batteries arranged in series and enclosed in a protective casing, part of which is broken away.
Figure 8:
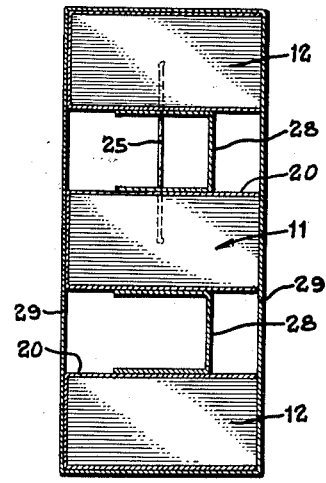
Figure 8 is a sectional view taken along line 8—8 of Figure 7.

Connecting wires 25 may conveniently be attached by soldering them, for example, to the dissimilar ends of adjacent batteries as shown in Figure 7. Figure 7 shows three such batteries arranged in series with leads 26 and 27 provided. Separator frames 28 hold each battery unit apart from the one adjacent and help form a rigid structure, but the frames themselves add little to the weight of the series assembly. This distended structure allows for air cooling of the respective battery units, an important factor under high temperature operations and during rapid activation. Encasement 29 provides insulation and facilitates handling. Insulation tends to make the performance of the batteries less affected by outside atmospheric temperature conditions.

Water is generally a satisfactory electrolyte for this magnesium-cuprous chloride cell. One disadvantage, however, is that with water alone these batteries require from ten to fifteen minutes to come up to a workable voltage range. Various inorganic salts may lessen activation time. Ammonium chloride in the proportion of 0.5% by weight reduces the time to about seven minutes. With 1% by weight of ammonium chloride in the electrolyte, battery activation is obtained within five minutes. With ammonium chloride alone in the electrolyte, battery failure through overheating becomes a serious problem. However, as little as 0.5% by weight of cadmium chloride is instrumental in reducing overheating effects. Best results were obtained when using about 1.25% cadmium chloride. Thus, ammonium chloride is included to give faster initial activation and cadmium chloride is added to guard against overheating. Concentrations of as high as 2.5% cadmium chloride by weight have also been used for these purposes. This aspect of the invention is more fully described and claimed in my copending application Serial No. 421,424, filed April 6, 1954, which is assigned to the assignee of this invention.

The following example describes in detail the construction of a battery assembly and its performance under extremes of temperature. It is to be understood, however, that this example in no way limits the scope of the foregoing disclosure.

*Example*

In assembling a three-unit structure of twenty-five cells per unit, magnesium plates 0.75 inch by 0.75 inch by 0.014 inch thick are spot-welded to copper plates of similar height and width, 0.005 inch thick. Fibrous separating blocks of comparable height and width, 0.075 inch thick are employed. The cuprous chloride is admixed with 10.4% by weight polystyrene binder to produce a paste which is pasted to a 16 x 16 bronze screen wire. From these materials together with casing substances the three battery units are fabricated as previously described. Each unit is immersed in electrolyte for one minute. This electrolyte is an aqueous solution containing 1% ammonium chloride and 1.25% cadmium chloride. The three battery units are interconnected. The wet weight of the three-unit battery is found to be 275 grams, of which 93 grams is electrolyte, 20 grams magnesium sheeting, 54 grams cuprous chloride and the remainder copper, fabric separator, polystyrene and casing materials.

The performance of one such three-unit battery under temperature extremes follows: Ambient temperature for the first 30 minutes of discharge was 130° F., during which time the assembly reached a maximum temperature of 140° F. The remaining discharge was carried out at —58° F. The 30-minute initial discharge at elevated temperatures aids in protecting against the excessive cold atmosphere which is contemplated under operating conditions. Total discharge time was three hours under a load of 30 ma. Voltage of 95 v. was reached within 2½ minutes and the maximum voltage attained was 113 v.

A particular battery assembly may be comprised of as many cell units as is deemed desirable. The structure adopted may be, in fact, continuous as, for example, by arranging the layer elements radially in a circle or in a comparable closed ring construction.

Having described my invention, I claim:

1. In a deferred action type battery using the electrochemical system magnesium-cuprous chloride and comprising a pile of flat cell units each of said flat cell units comprising a negative magnesium electrode, a positive cuprous chloride electrode, a spacer of bibulous electrolyte retaining material between said electrodes and conductive plates of liquid tight material between the cell units characterized in that said conductive plate and said magnesium electrode form a unitary structure, the free surface of said conductive plate being in intimate contact with said positive electrode, each cuprous chloride positive electrode consisting of a porous spongy mass of cuprous chloride disposed upon both sides of and adhering to a metallic screen, the wires of said screen protruding from the cuprous chloride on one edge of the electrode, the said protruding wires being bent over to constitute flexible fingers which yieldably engage the conductive plate between the cell units.

2. A cuprous chloride positive electrode comprising a rectilinear screen having a mass of spongy porous cuprous chloride containing polystyrene on each side thereof and adhering thereto, the wires of the screen protruding from the cuprous chloride along one edge of the electrode, the said wires being bent over to extend beyond one electrode surface to facilitate the establishment of electrical contact with the adjacent element.

References Cited in the file of this patent

UNITED STATES PATENTS

| Number | Name | Date |
| --- | --- | --- |
| Re. 14,929 | Baumann | Aug. 17, 1920 |
| 1,377,722 | Marconi | May 10, 1921 |
| 1,737,130 | Storey et al. | Nov. 26, 1929 |
| 1,797,161 | Strohl et al. | Mar. 17, 1931 |
| 2,040,255 | Gordon | May 12, 1936 |
| 2,322,210 | Adams | June 22, 1943 |
| 2,519,053 | Reinhardt | Aug. 15, 1950 |
| 2,536,697 | Ruben | Jan. 2, 1951 |
| 2,636,060 | Fischbach et al. | Apr. 21, 1953 |
| 2,640,090 | Pucher et al. | May 26, 1953 |
| 2,640,863 | Ellis | June 2, 1953 |

FOREIGN PATENTS

| Number | Country | Date |
| --- | --- | --- |
| 90,161 | Switzerland | Dec. 1, 1921 |
| 173,251 | Great Britain | Jan. 3, 1922 |
| 482,363 | Great Britain | Mar. 24, 1938 |